2,872,336

CARBON BLACK PELLET AND METHOD FOR PRODUCING SAME

Jack A. Weaver, Monroe, La., assignor to Columbian Carbon Company, New York, N. Y., a corporation of Delaware No Drawing. Application August 9, 1956
Serial No. 603,177

5 Claims. (Cl. 106—307)

This invention relates to carbon black in pelleted form, usually referred to as beads, and provides improved carbon black beads having increased resistance to crushing and packing during shipment, storage and handling. The invention also provides a method of making these improved beads.

Carbon black, as initially produced, is a very light, fluffy powder having a density as low as three pounds per cubic foot and which readily flies into the atmosphere. The objections to the handling of carbon black in that form are well known.

In order to increase its bulk density, reduce flying and minimize handling difficulties, the art has developed methods and means for forming the carbon black into relatively dustless, free-flowing, generally spheroidal beads, or pellets, of sufficient strength to withstand ordinary handling without crushing or packing or losing their free-flowing characteristics.

One such method is described in the Herman J. Glaxner Patent Re. 21,379, in accordance with which the carbon black is mixed and agitated with approximately an equal weight of water while being passed through an elongated chamber or drum equipped with spaced blades or pins rotating transversely of the direction of the advancing movement of the mass. The carbon black and water are thus formed into a pasty mass and eventually into moist, generally spheroidal beads, as the mass progresses through the chamber. The resultant moist beads are then dried to a moisture content of about 1%, or less, by weight. Beads produced by processes of this general type are usually designated "wet process beads."

An improved process of the wet bead type is described and claimed in the Roy L. Gholson Patent 2,550,802, issued May 1, 1951, in accordance with which an increment of finely divided black and an increment of water, sufficient to form the powdered black into beads, are mixed and the mixture subjected to agitation until it has been substantially completely formed into beads; the beads thus formed are then agitated with a further increment of carbon black in a second agitating zone until the previously formed beads have become disintegrated, and thereafter a second increment of water is added in an amount sufficient to form the composite black mixture into beads and the mixture agitated as before until it is substantially completely formed into beads. According to that patent, this procedure is repeated as often as is necessary in order to produce beads of the maximum crushing strength obtainable by that method. The beads are thereafter dried, by any suitable means, to a moisture content usually not in excess of about 1% by weight.

Various other procedures have been proposed for forming carbon black beads by this general wet bead method, the proportion of water used varying somewhat with the beading characteristics of the particular carbon black and the procedure followed.

Carbon black beads produced by many of these wet bead procedures are, after drying, substantially dustless and of materially increased density. They can be subjected to ordinary conditions of shipment and conveyor handling without crushing or packing or loss of their free-flowing characteristics.

However, in presently used, or proposed, conveyor systems, the pellets are frequently subjected to such severe handling as to cause them to crush and pack so as to lose their free-flowing, dustless characteristics. Accordingly, the industry has been confronted with the problem of further increasing the resistance of the carbon black beads to crushing and packing without disturbing their rubber-compounding properties.

I have discovered, quite unexpectedly, that the crushing strength and packing point of such beads can be substantially increased by including in the beaded carbon black a minor proportion of sodium tetraborate, not less than about 0.1% based on the weight of the carbon black. Somewhat larger proportions of the tetraborate may frequently be used with advantage. I have with marked advantage used proportions ranging as high as 0.25%, calculated as anhydrous tetraborate on the weight of the dry carbon black. Frequently, somewhat larger proportions may be used without deleterious effects.

In accordance with a particularly advantageous aspect of the invention, the tetraborate is incorporated in the carbon black beads by mixing it with the beading water used in the wet beading process. In such operations, the tetraborate, advantageously as borax, is dissolved in the beading water and is uniformly dispersed in the carbon black as an aqueous solution in the beading operation. In the subsequent drying of the beads, the water of crystallization may be driven off, at least in part, together with the usual beading water and the tetraborate in substantially dry form remains dispersed in the carbon black constituting the beads.

The temperature at which the beads are dried is subject to considerable variation. The extent of dehydration of the borax does not appear to be critical so long as the proportion of free water present in the beads does not exceed that permissible in conventional dry beads, ordinarily not in excess of about 3% by weight.

In conventional practice, the beads are usually dried to a moisture content of about 1% or less. When exposed to moist air, a small proportion of further water may be absorbed by the carbon black, but not in sufficient amount to destroy the free-flowing characteristics of the beads.

The invention has been used with particular advantage in conjunction with wet beading operations of the type described and claimed in the Glaxner Patent 2,187,601, but its utility extends to all types of beading processes involving the steps of wetting the carbon black with water and substantially drying the resultant beads leaving the tetraborate in the carbon black. Preferably, the borax is dissolved in the water used in the initial beading step, described in the patent, but may be introduced into the black in solution in any one of the water increments.

The optimum proportion of water and borax used in forming the beads in accordance with my invention will depend primarily upon the beading characteristics of the particular black being treated and the desired resistance to crushing. Advantageously, a relatively concentrated solution of borax is prepared and the solution is thereafter uniformly mixed in a constant, metered proportion with the water being passed at a uniform rate to the beading operation.

I have, for instance, prepared such concentrated solution of tetraborate by adding 500 pounds of borax to a 600-gallon tank, half filled with water and equipped with an open steam coil. The mixture was agitated by means of a power-driven mixer and heated by introducing steam through the steam coil. This procedure was continued, while allowing the steam to condense in the tank, until a full tank of an aqueous solution of the borax is obtained. This relatively concentrated borax solution was then injected into the water line leading to the bead mixer through which the beading water was being passed at a uniform rate. The proportion of borax solution added was controlled by means of a Milton Roy proportioning pump, or a conventional Rotameter, so as to deposit the prescribed proportion of borax, calculated as anhydrous sodium tetraborate, in the carbon black.

As is well understood in this art, the resistance of carbon black beads to crushing is dependent, in large measure, upon the type of carbon black constituting the beads. For instance, under optimum, comparable conditions stronger beads are prepared from channel black than from the various grades of furnace black. Similarly, beads prepared from different grades of furnace black, under comparable, optimum conditions have been found to vary considerably as to crushing strength. Also, the optimum proportion of water used in preparing beads from the various grades of carbon blacks by the wet process have been found to vary considerably with the type of black being treated, as is also understood in the art.

I have found, however, that regardless of the type of black being treated, the incorporation of sodium tetraborate in the carbon black beads, in proportions within the specified range, materially increases the packing point and crushing strength over those obtained by conventional methods, for instance, using water alone in a wet bead process.

The herein referred to crushing strength of the beads is determined by carefully selecting from a mass of beads to be tested a single bead screened selctively to 0.6 mm. in diameter and placing the selected bead on a glass slide resting on one pan of an analytical balance. A second glass slide is rigidly supported in a fixed position just above the upper surface of the bead. After careful adjustment for tare, the other pan of the balance is gradually weighted until the bead between the glass slide is seen to crush or crack open. The crushing strength is then reported in grams.

The characteristic herein referred to as "packing point" is determined by placing a metal disk in the lower end of a 2-inch pipe 4¼ inches long held in a vertical position. The pipe is then almost filled with the carbon black beads to be tested and a similar disk is carefully placed on the surface of the pellets in the upper end of the tube. A constant weight is then applied to the upper disk for a period of 2-4 seconds. Thereafter, the weight is removed. If the beads flow freely from the pipe upon removal of the lower disk, the operation is repeated using an increased weight. If, at the increased weight, the beads bridge over and do not flow freely through the pipe upon removal of the weight and of the lower disk, the test is repeated with a somewhat decreased weight. The weight in pounds being applied to the upper disk when the beads just begin to bridge over within the pipe is recorded as the "packing point."

The invention will be further illustrated by the following specific examples of carbon black beads prepared by the wet process, previously described, in which the indicated proportions of anhydrous sodium tetraborate were incorporated in the beads by dissolving it in the first increment of the beading water in a three-stage wet beading operation of the type described in the Glaxner Patent 2,187,601.

EXAMPLE I

In the pelleting of an HAF type of black by the wet beading process, using water alone, the resultant dried beads were found to have a packing point of 30. By dissolving in the beading water an amount of borax sufficient to leave the equivalent of 0.1% by weight of anhydrous sodium tetraborate in the beads, other conditions being comparable, the packing point was raised to 40.

EXAMPLE II

In the pelleting of an FEF type of black by the wet bead process using water alone, the resultant dried beads were found to have a packing point of 20 and a crushing strength of 1.8. By the inclusion of a minor proportion of borax in the beading water, within the previously indicated range, other conditions being comparable, the packing point of the resultant beads was increased to 25 and the crushing strength was increased to 2.2.

EXAMPLE III

In the beading of an SRF type of black by the wet bead process using water alone, dried beads were obtained having a packing point of 30 and a crushing strength of 7.5. By including in the beading water an amount of borax within the previously indicated range, other conditions being comparable, the packing point was increased to 45 and the crushing strength was increased to 8.4.

EXAMPLE IV

In the beading of a further type of furnace black by the wet bead method using water alone, dried beads were obtained having a packing point of 20 and a crushing strength of 3.6. By the inclusion of six grams of borax per gallon of beading water, other conditions being comparable, the backing point was increased to 27.5 and the crushing strength to 4.5. Where 24 grams per gallon of borax was included in the beading water, the packing point was increased to 32.5 and the crushing strength increased to 5.8. The packing point was further increased to 45 by the inclusion of 49 grams of borax per gallon in the beading water, i. e. the equivalent of about 0.7% sodium tetraborate based on the dry weight of the carbon black.

EXAMPLE V

The extent of the increase in the crushing resistance of the beads is generally increased by increasing the proportion of borax incorporated in the beads. This fact is illustrated by the foregoing example and following tabulation of packing points and crushing strengths of beads produced by the wet bead method from HMF type of black containing the indicated proportions of sodium tetraborate. The values given are average values obtained over extended periods of operation.

*Table 1*

| Proportion of Sodium Tetraborate | Packing Point | Crushing Strength |
| --- | --- | --- |
| 0.1% | 29.6 | 8.3 |
| 0.15% | 31.4 | 9.4 |
| 0.25% | 44.4 | 11.0 |

EXAMPLE VI

The effect of increasing the proportion of sodium tetraborate is further illustrated by the following tabulation of average packing points and crushing strengths of an FEF type of black containing the indicated proportions of sodium tetraborate.

*Table 2*

| Proportion of Sodium Tetraborate | Packing Point | Crushing Strength |
| --- | --- | --- |
| 0.10% | 23.6 | 6.5 |
| 0.15% | 28.2 | 7.4 |
| 0.25% | 36.9 | 8.2 |

The invention is of particular utility and effectiveness as applied to the pelleting of furnace carbon blacks because of their recognized resistance to the forming of beads of adequate strength. However, in a broader aspect, the invention is also applicable to pelleting of all other types of carbon black.

I claim:

1. A substantially dry carbon black bead containing from about 0.1% to about 0.7% of sodium tetraborate, calculated as anhydrous sodium tetraborate, based on the weight of dry carbon black, uniformly distributed throughout the carbon black bead.

2. The product of claim 1 in which the carbon black is a furnace carbon black.

3. In the method of producing substantially dry beads of carbon black whereby the carbon black is wetted with water and the carbon black beads thereafter dried, the step of including in the water with which the black is wetted a proportion of sodium tetraborate not less than about 0.1% nor in excess of about 0.7 calculated as anhydrous sodium tetraborate, based on the weight of the dry carbon black.

4. The method of claim 3 in which the carbon black is a furnace carbon black.

5. In the wet beading process of producing substantially dry carbon black beads in which the carbon black is agitated with water to form the carbon black into wet beads and the beads are thereafter dried, the method of increasing the resistance of the resultant dried beads to crushing which comprises the step of dissolving in the water, prior to mixing it with carbon black, borax in an amount equivalent to about 0.1% to about 0.25% of anhydrous sodium tetraborate based on the weight of the dried beads and thereby uniformly dispersing the borax in the carbon black.

References Cited in the file of this patent

UNITED STATES PATENTS

| | | |
|---|---|---|
| 2,457,962 | Whaley | Jan. 4, 1949 |
| 2,652,344 | Simms | Sept. 15, 1953 |